March 24, 1925.
J. C. KARNES
INCLINOMETER
Filed July 15, 1921
1,531,191
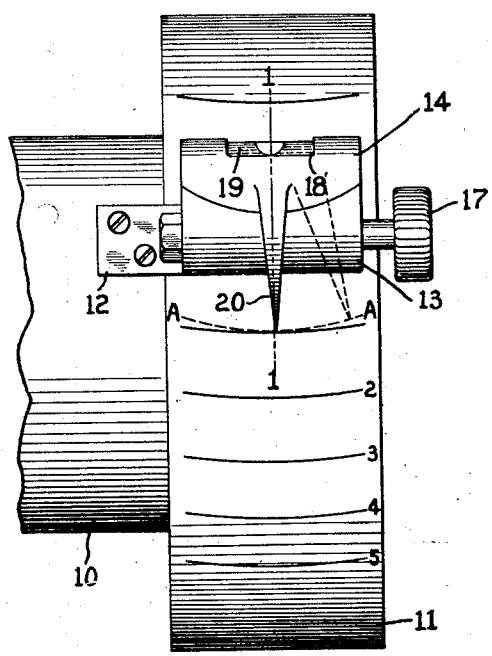
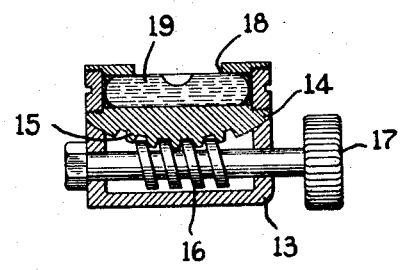
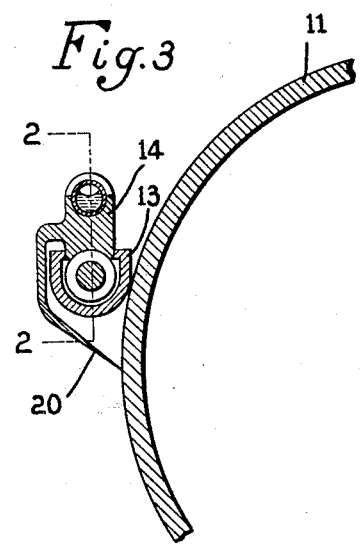
Inventor:
James C. Karnes.

Patented Mar. 24, 1925.

1,531,191

UNITED STATES PATENT OFFICE.

JAMES C. KARNES, OF BUFFALO, NEW YORK.

INCLINOMETER.

Application filed July 15, 1921. Serial No. 485,061.

*To all whom it may concern:*

Be it known that I, JAMES C. KARNES, a citizen of the United States, and a resident of Buffalo, county of Erie, and State of New York, have invented an Improvement in Inclinometers, of which the following is a specification.

The subject of this invention is an indicator devised to show the true angular elevation of a gun or other structure, the angular elevation of which is to be indicated.

In actual practice a gun is often so placed that one trunnion is lower than the other, or in other words the transverse axis is displaced at an angle to the horizontal. With a gun so placed a given angular elevation will not be the true angular elevation with respect to the horizontal and will deviate therefrom in direct proportion to the angular displacement of the transverse axis.

The present invention is devised, primarily to overcome this defect and to provide a ready means for ascertaining the true angular elevation with respect to the horizontal.

With the foregoing and other objects in view my invention resides in the novel arrangement and combination of parts and in the details of construction hereinafter described and claimed, it being understood, that changes in the precise embodiment of the invention herein disclosed may be made within the scope of what is claimed without departing from the spirit of the invention.

One practical embodiment of the invention is illustrated in the accompanying drawing, wherein:

Fig. 1 is a view in elevation of an indicator constructed in accordance with my invention;

Fig. 2 is a detail sectional view taken on the line 2—2 of Fig. 3;

Fig. 3 is a sectional view taken on the line 1—1 of Fig. 1.

Referring to the drawings by numerals of reference:

A fragment of a trunnion 10 of a gun is illustrated in Fig. 1 on which the drum 11 of the indicator forming the subject of the present invention is shown mounted. While I have herein illustrated the indicator as mounted on the trunnion it is to be understood that the same may be attached to any part that rotates during elevation of the gun.

The drum 11 is rigid with the trunnion so as to move therewith and has spaced about its circumference the curved graduations 2, 3, 4, 5, etc., laid out according to degrees and parts thereof of elevation.

Connected by a bracket 12 to a relatively stationary part of the gun so as to be positioned adjacent the drum, is a casing 13, formed with a slot in its upper plate for the reception, with a sliding fit, of a block 14 formed with a worm segment 15 on its under surface which segment is adapted to mesh with a worm 16 formed on a shaft journaled in the casing 13 and provided with a milled thumb wheel 17 on one extending end through manipulation of which the worm may be rotated to rock the block 14.

A sight opening 18 is provided in the block 14 to permit a view of a level tube 19, suitably mounted in the block. When the bubble in the tube 19 has assumed a central position, as shown in the figures of the drawing, the operator knows that the block 14 is in a horizontal position and that the pointer 20, which is positioned at right angles to the block, is in a vertical position. The block is formed with a downwardly projecting pointer 20 the end of which is adapted to register successively with the graduations on the drum to indicate the angular displacement of the gun in elevation.

As will be understood from Fig. 1, when the block 14 is rocked by manipulation of the worm, the pointer will follow the dotted line A—A, which line does not coincide with the true graduation line but recedes therefrom as the angular displacement of the transverse axis of the gun becomes greater.

In practice the device is operated in the following manner:

When the gun is placed, if the transverse axis, that is the axis of the trunnions, is horizontal, the pointer will register with the center line of the drum during elevation and no adjustment thereof will be necessary; should, however, the transverse axis be inclined to the horizontal, the thumb wheel 17 is manipulated to rock, through the worm and segment, the block 14 until the bubble in the level tube indicates a horizontal position. The gun is then elevated until the pointer is brought to the desired graduation line which will indicate the true angular elevation of the gun.

Having described my invention what I claim as new and desire to secure by Letters Patent, is:

1. The combination with a rotatable member and a relatively stationary member, of a drum secured to the rotatable member, graduations spaced apart about the circumference of the drum, a casing secured to the stationary member adjacent the drum, a worm journaled in the casing, a block mounted in the casing and formed with a worm wheel segment meshing with the worm, a level secured to the block, the longitudinal axis of the level extending transversely of the object being elevated and a pointer carried by the block and adapted to register with the graduations on the drum.

2. The combination with a rotatable member and a relatively stationary member, of a drum secured to the rotatable member, graduations spaced apart about the circumference of the drum for indicating the true angular displacement in a vertical plane, a casing secured to the stationary member, a block rockably mounted in said casing, means for rocking said block, a level carried by the said block the longitudinal axis of the level extending transversely of the object being elevated and a pointer secured to the block and adapted to register with the graduations.

3. The combination with a mechanism an element of which is adapted for angular displacement in a given plane, of a drum movable in unison with the element, graduations on said drum, a pointer carried by a relatively stationary member of the mechanism and movable transversely of the drum to bring its longitudinal axis into the given plane, and means for indicating when such axis of the pointer is in the given plane, the pointer adapted to register with the graduations whereby true angular displacement may be read.

JAMES C. KARNES.